United States Patent [19]
Koivunen

[11] 3,966,032
[45] June 29, 1976

[54] HYDRODYNAMIC DRIVE AND SLIPPING CLUTCH

[75] Inventor: Erkki A. Koivunen, Livonia, Mich.

[73] Assignee: General Motors Corporation, Detroit, Mich.

[22] Filed: June 9, 1975

[21] Appl. No.: 585,238

[52] U.S. Cl................................ 192/3.3; 192/3.31; 192/103 F; 251/81; 251/248
[51] Int. Cl.².......................................... F16D 39/00
[58] Field of Search.................. 192/3.29, 3.3, 3.31; 74/733

[56] References Cited
UNITED STATES PATENTS

| | | | |
|---|---|---|---|
| 2,699,074 | 1/1955 | Livezey et al........................ | 192/3.3 |
| 3,734,251 | 5/1973 | Annis et al......................... | 192/3.3 |

*Primary Examiner*—Benjamin W. Wyche
*Attorney, Agent, or Firm*—Donald F. Scherer

[57] ABSTRACT

A drive mechanism for an automotive transmission wherein a hydrodynamic drive unit and a friction drive unit are arranged for parallel independent drives. The friction drive unit is maintained in a slipping drive condition to control a predetermined slip in the hydrodynamic drive unit. The slip speed of the friction drive unit is controlled by an engagement force thereon, which force is determined by fluid flow through a variable area passage. The passage opening is responsive to the speed of the input and output members of the drive mechanism in direct relation with one member and a proportional relation with the other member.

6 Claims, 5 Drawing Figures

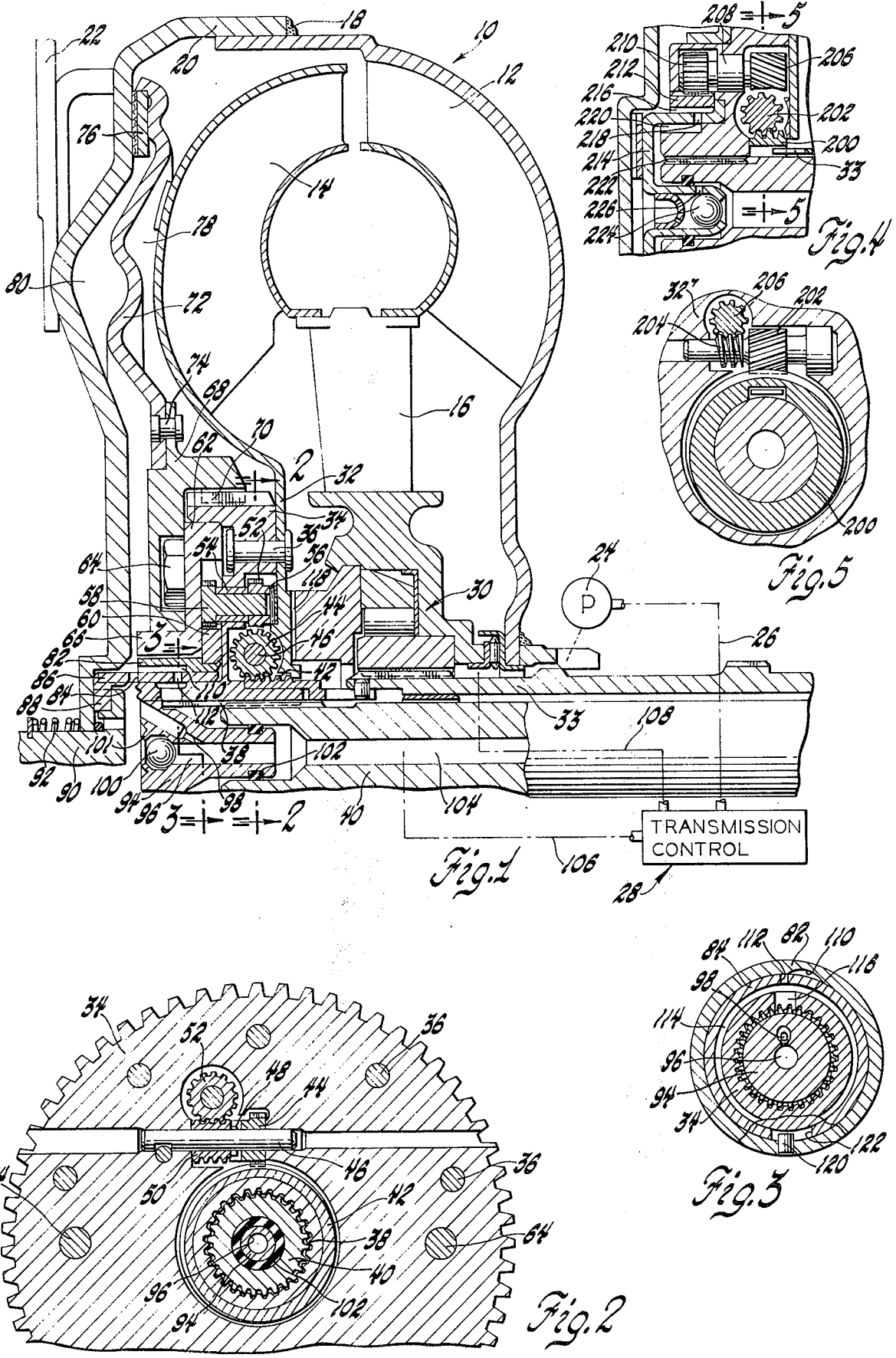

HYDRODYNAMIC DRIVE AND SLIPPING CLUTCH

Prior art transmissions such as Annis et al U.S. Pat. No. 3,730,315 and Malloy U.S. Pat. No. 3,693,478 disclose a slipping clutch arranged in parallel drive relation with a hydrodynamic drive. These patents are directed toward maintaining a constant absolute speed differential or slip between the components of the hydrodynamic drive, e.g., the impeller and turbine. This constant speed differential is maintained throughout a wide range of input speeds and does provide an increase in the overall efficiency of the transmission. The present invention provides a constant percentage speed differential or slip between the impeller and turbine throughout a wide range of input speeds. To this extent, the present invention differs considerably from the prior art. The present invention also provides an increase in overall efficiency of the transmission in that the constant percentage speed differential, maintained by the slipping clutch, is less than the normal speed differential within the hydrodynamic drive. The slip speed is more predictable and can be established at a predetermined value more readily with the present invention than is possible with prior slipping clutches.

There are also known in the prior art, a number of lockup type clutches used in parallel with a hydrodynamic drive. These devices differ considerably in concept and function from a slipping clutch. A lockup clutch effectively removes the hydrodynamic drive efficiency from the transmission. However, a secondary problem, engine torsional vibrations, must be overcome with a lockup clutch. This is accomplished in such clutches by use of a vibration dampener which has the disadvantage in that it adds to the complexity of the clutch structure.

Since the hydrodynamic drive is effective to eliminate engine torsionals even when a slipping clutch is used in parallel therewith, the present invention does not have to provide a dampener and, therefore, does not have the abovementioned disadvantage.

In one form of mechanical transmission, which may be advantageously applied to automobile transmissions, hydrodynamic drive elements connect an input shaft to an output shaft, and a mechanical friction clutch supplements such drive. The frictional engagement of the clutch is controlled in response to slip between the input shaft and the output shaft so as to maintain a predetermined constant percentage slip. The present invention relates to a transmission of this type and particularly to such a transmission suitable for use in an automobile.

It is a general object of the present invention to provide an improved transmission including hydrodynamic drive elements and friction drive elements arranged in parallel drive relation, and wherein the engaging force of the friction drive elements is variably controlled by a pair of relatively angularly movable elements defining a variable sized passage, one of the elements being driven at a predetermined proportion of input or output speed and the unit as a whole being so arranged that a predetermined constant percentage slip is maintained between the hydrodynamic drive elements.

It is a more specific object of the present invention to provide an improved transmission of the foregoing type wherein at least one of the pair of relatively rotatable elements is itself frictionally driven and stop elements limit the angular movement of the rotatable elements in relation to each other so that the unit quickly responds to slip.

Another specific object of the present invention is to provide an improved transmission of the type mentioned above where the variably sized passage defined by the pair of relatively movable elements serves to create a fluid pressure differential which in turn generates the force applying the friction drive elements.

A further and still more specific object of the present invention is to provide an improved transmission of the foregoing types wherein the input shell and impeller elements of the conventional automobile transmission define a toroidal housing which encompasses and contains the entire friction clutch and clutch engaging control elements, the torque converter discharge fluid actuates the friction drive elements, and in other respects features of construction, combination, and arrangement are used to provide a transmission that can be used in the same space and in the same manner as present conventional automobile transmissions and nevertheless provides the controlled and limited constant percentage slip action.

Another and more specific object of this invention is to provide an improved drive mechanism having input and output members with a hydrodynamic drive and a friction drive arranged in parallel drive relation between the input and output members and wherein the engaging force of the friction drive is controlled by a variable fluid passage controlled in response to the speed differential between said input and output members to maintain a predetermined constant percentage slip condition in said hydrodynamic drive.

A further object of this invention is to provide an improved drive mechanism having a drive member and a driven member which are drivingly connected by a fluid drive and a friction clutch arranged in independent parallel drive relation between the members and wherein the friction clutch is engaged in response to a differential pressure to provide a controlled friction drive between the members and also wherein the differential pressure is controlled by a two part hydraulic passage having a variable opening controlled by the speed differential between members to maintain an engagement force in the friction clutch so that a predetermined constant percentage slip is maintained between the members.

A still further object of this invention is to provide an improved drive mechanism having a driving input member and a driven output member which are drivingly connected through parallel drive paths by a torque converter and a friction clutch and wherein the friction clutch engagement is controlled by a differential pressure which pressure is established by fluid flow through a variable fluid passage comprised of two relatively rotatable members one of which is driven through a friction connection by the input member and the other of which is driven by the output member, through a gear mechanism, at a speed proportional to the output member whereby fluid flow is controlled through said passage to maintain the friction clutch engaged with sufficient force to establish a predetermined constant percentage slip ratio between the input member and the output member.

These and other objects and advantages of the present invention will be more apparent from the following description of the drawings, in which:

FIG. 1 is a cross-sectional view of a torque converter and clutch;

FIG. 2 is a cross-sectional view taken along the line 2—2 of FIG. 1;

FIG. 3 is a cross-sectional view taken along line 3—3 of FIG. 1;

FIG. 4 is a cross-sectional view of a second embodiment of the control restriction and gear drive; and FIG. 5 is a cross-sectional view taken along line 5—5 of FIG. 4.

Referring to the drawings wherein like characters represent the same or corresponding parts, there is shown in FIG. 1 a torque converter 10 having a bladed impeller element 12, a bladed turbine element 14 and a bladed stator element 16. These three elements combine to form a conventional torous fluid circuit the operation of which is well known. The impeller 12 is welded or otherwise secured at 18 to an input shell 20 which is adapted to be drivingly connected to a prime mover through a plate 22. The impeller 12 is also drivingly connected to a conventional positive displacement pump shown schematically at 24, which pump 24 supplies fluid pressure via passage 26 to a conventional transmission control designated 28. The transmission control may be constructed in accordance with the teaching of U.S. Pat. No. 3,321,056 issued to Winchell et al and the U.S. patent issued to Malloy U.S. Pat. No. 3,693,478. The stator 16 is drivingly connected through a conventional one-way device, designated 30, to a stator shaft 33 which is grounded to the transmission case in a conventional manner.

The turbine 14 has an inwardly extending annular portion 32 to which is riveted a cage 34 by a plurality of rivets 36. The cage 34 has an inner splined surface 38 which is drivingly connected to a turbine output shaft 40. The turbine output shaft is adapted to be connected, in a conventional manner, to a planetary gear transmission such as that shown in the above-mentioned U.S. Pat. No. 3,321,056. The stator shaft 33 is connected to a worm gear 42 such that the worm gear 42 is secured to the transmission housing to remain stationary.

The cage 34 houses a gear 44 rotatably mounted on a pin 46 which is secured in the cage 34. The gear 44 meshes with the worm gear 42 and is drivingly connected at 48 to a second worm gear 50. The worm gear 50 meshes with a gear 52 which is rotatably supported in a bushing 54 disposed in the cage 34. The gear 52 is drivingly connected through a pin 56 to a shaft and spur gear 58 which in turn meshes with a spur gear 60. The cage 34 is enclosed on one side by the portion 32 of turbine 14 and on the other side by a cover 62 which is secured to the cage 34 by threaded fasteners 64.

The cover 62 has formed thereon a flange portion 66 on which is slidably disposed a hub 68 which hub 68 is also splined at 70 to the cage 34. A clutch plate 72 is riveted to the hub 68 by a plurality of rivets 74. At the outer periphery of the clutch plate 72 is a friction surface 76 which is adapted to frictionally engage the input shell 20 so as to provide a mechanical friction drive between the input shell 20 and the cage 34 which as was mentioned above is splined to the turbine output shaft 40. The clutch plate 72 divides the space between turbine 14 and input shell 20 into two separate chambers, namely an engagement chamber 78 formed between the turbine and the clutch plate 72 and a disengagement chamber 80 formed between the clutch plate 72 and the input shell 20. As will be discussed later a relative pressure in these chambers controls the engagement force of the clutch plate 72.

The gear 60 is secured to an annular sleeve member 82 such that the sleeve member 82 rotates in unison with the gear 60. Telescoped within the annular member 82 is another annular member 84 which is rotatably supported on the inner diameter portion of cage 34. The annular member 84 is connected through a tang drive at 86 to a friction member 88 which is adapted to be driven frictionally by the input shell 20. The member 88 is urged against the input shell 20 by a plug member 90 and a compression spring 92 to establish the friction force desired. Through this friction drive, the sleeve 86 and friction member 88 are urged to rotate in unison with the input shell 20.

The inner diameter of cage 34 has pressed therein a plug 94 which has a central bore 96 which is communicated with the chamber 80 through a restriction 98 and through a ball check valve 100. The ball check valve 100 readily admits free flow, past staked portion 101, to the chamber 80 while the restriction 98 allows control flow from the chamber 80 as will be explained later. The plug 94 is sealingly engaged in the driven shaft 40 by a seal 102. The central passage 96 of plug 94 is aligned with a passage 104 formed in the driven output shaft 40 which passage 104 is in fluid communication with a passage 106 from the transmission control 28. Also in fluid communication through a passage 108 from the transmission control 28 is the space between stator 16 and impeller 12.

As seen in FIGS. 1 and 3 there is an elongated groove 110 formed in the annular member 82 and a radial passage 112 formed in the annular member 84. The inner end of passage 112 is aligned with an annular groove 114 formed in the cage 34. This annular groove 114 is in fluid communication with a passage 116 which is open at the inner diameter of cage 34. The inner diameter of cage 34 is in fluid communication through spline 38 and a radial passage 118 with the fluid found in the torque converter 10. Since the annular members 82 and 84 are relatively rotatable the passages 112 and 110 can be aligned to permit fluid flow. The amount of angular relative movement between the annular members 82 and 84 is controlled by a pin 120 which is secured in member 82 and a flat 122 which is formed in the annular member 84. Since the outer member 82 is positively driven by the spur gear 60 and the inner member 84 is driven to a friction connection by the input shell 20, whenever there is a speed difference between gear 60 and input shell 20, the two members 82 and 84 will be driven in unison by the pin 120 and slot 122.

The worm gear 42, gear 44, worm gear 50, gear 52, spur gear 58 and spur gear 60, provide a predetermined gear ratio between the speed of cage 34, which rotates at the speed of clutch 72 and turbine 14, and the speed of annular member 82. This predetermined speed ratio is determined by the gear ratios in the aforementioned gears. The gear arrangement is closely akin to that of a planetary gear set if the cage 34 is considered the planetary carrier, the worm gear 42 is considered as a sun gear and the spur gear 60 is considered a sun gear. When the worm gear 42 is grounded, as is here, the spur gear 60 will be driven in the same direction as the cage 34 but at an increased speed ratio. The increased speed ratio is determined by the number of teeth on the various meshing gears in the system. In the preferred embodiment of this invention, the gear ratio between gear 42 and 60 is 100:1, such that output direction of rotation is opposite to the input. However, this ratio can easily be changed by changing the number of teeth on the gears. This will maintain the gear 60 at a speed one percent (1%) greater than the speed of cage 34. Thus, if the turbine and cage 34 are rotating at a speed of 1,000 rpm, the gear 60 will rotate at 1010 rpm. If the input shell is rotating at 1010 rpm, the annular member 84 will also rotate at 1010 rpm. Thus the two annular members will be in unison. At this time, the flow control established by the passages 110 and 112 is sufficient to maintain a predetermined pressure differential between the chambers 78 and 80 whereby the clutch engagement force is maintained sufficient to establish the 1% speed differential required. With the clutch 72 slippingly engaged, the majority of input torque is carried by the friction clutch 72 and a minor portion is carried by the turbine 14. The chamber 80 during this time is in fluid communication through the restriction or orifice 98 to exhaust in the transmission control while fluid pressure is applied to the converter through passage 108 from where it passes outwardly between the impeller 12 and turbine 14 to the chamber 78. The fluid in the turbine 14 passes through passages 118 and 116 to the passages 112 and 110. If the input shell 20 is increased in speed above the speed of the gear 60, the relative angular position of the annular members 82 and 84 will be automatically adjusted to cause a decrease in the opening formed by passages 110 and 112 to cause a decrease in fluid flow to chamber 80 and therefore an increase in the applied pressure of clutch 72 which will be accompanied by an increase in the speed of turbine 14 and clutch 72 which will provide an increase in speed in gear 60 to establish a new flow control position for passages 110 and 112. If the speed of input shell 20 should decrease relative to the speed of gear 60, the opening formed by passages 110 and 112 will increase to permit more fluid flow to enter the disengage chamber 80 which will result in an increase in pressure therein since the discharge therefrom is controlled by a fixed restriction. The increase in pressure in chamber 80 will result in a decrease in clutch engagement force which will decrease the torque capacity of clutch 72 and result in a decrease in speed of the clutch 72 and turbine 14 until the gear 60 has rotated the annular member 82 a sufficient amount relative to the member 84 to establish a new equilibrium position between the openings 110 and 112.

FIGS. 4 and 5 provide another embodiment of the gearing arrangement to be used between the flow control members which control the engagement of clutch 72. In FIG. 4 there is seen a worm gear 200 which is secured to the stator shaft 33. This worm gear 200 meshes with a gear 202 which in turn drives a second worm gear 204. The gear 202 and worm gear 204 are both rotatably mounted in a carrier 32'. The worm gear 204 meshes with a gear 206 which in turn is drivingly connected through a shaft 208 with a spur gear 210. The spur gear 210 engages the spur gear 212 which is rotatably supported on and telescoped within an annular member 214. The inner diameter of gear 212 provides one of the control passage members and has a groove 216 formed therein which is similar to groove 110. The annular member 214 has a radial passage 218 formed therein, which is similar to the passage 112. Fluid flow is provided through a slot 220 which is in fluid communication to a spline connection 222 with the fluid within the torque converter. The returning flow from the disengagement chamber is controlled by a one-way check valve 224 and a restriction 226. The annular member 214 is frictionally driven by the input shell. The friction force is determined by the pressure differential across the annular member 214. This gearing arrangement, seen in FIGS. 4 and 5, is also preferably at 100:1 gear reduction to maintain a 1% controlled slip within the torque converter and slipping clutch arrangement.

In operation the clutch can use controls for engaging and disengaging the clutch similar to that shown in Malloy U.S. Pat. No. 3,693,478. When it is desired to maintain the clutch disengaged, fluid pressure is supplied from the transmission control 28 via passage 106. Fluid in passage 106 passes through passages 104 and 96 and past check valve 100 to the disengage chamber 80. Fluid from the chamber 80 flows past friction surface 76 and to enter the torque converter 10 at the outer space between the impeller 12 and turbine 14. Leakage from the torque converter passes back through passage 108 to the transmission control and sump. To engage the clutch, the passage 108 is connected to fluid pressure and the passage 106 is connected to sump. Under this condition fluid pressure passes into the torque converter 10 around the torus circuit and through passage 118 to passage 116 and through openings 110 and 112 to the disengage chamber 80. The engage chamber 78 is filled from the torque converter. Fluid pressure in the disengage chamber is controlled by the amount of opening formed by the passages 110 and 112. When these passages are opened sufficiently to provide more flow than can be accepted by the restriction passage 98, the fluid pressure in chamber 80 will increase until the required pressure is available in chamber 80 to pass the necessary flow requirement of restriction 98. The system shown in FIG. 4 operates on a similar principle, that is fluid pressure freely flows past check valve 224 to the disengage chamber 80 when it is desired to maintain the clutch disengaged and is controlled by flow from the torque converter through passages 216 and 218 when it is desired to control the clutch at a predetermined slipping engagement.

Obviously many modifications are possible in light of the above teaching. It is therefore, to be understood that within the scope of the appended claims the invention may be practiced otherwise than as specifically described.

What is claimed is:
1. An automobile transmission, comprising:
drive means having an axis and defining an input shell portion and an impeller portion which together form a generally toroidal space;
output means defining a turbine located in said toroidal space, the impeller and turbine being in cooperative relationship to define a torque converter;
an annular friction member connected to said output means and disposed between the turbine and the input shell and define a frictional drive independent of the torque converter and having torque capability determined by the axial force applied to said member, said member being axially shiftable in relation to the input shell, said member defining a closed annular space in relation to the input shell on the input shell side of said member and an annular passage for discharge fluid from the torque converter on the other side of said member, whereby the axial force on the friction member is determined by the fluid pressure differential between the respective sides of said member; and means having two parts driven by said drive means and said output means, respectively, defining a hydraulic fluid passage of size determined by the angular relation between said two parts, one of said parts being driven at a predetermined proportion of the speed of one of said drive or output means and the other of said parts being driven at the speed of the other of said drive or output means, said hydraulic fluid passage being disposed to controllably vary the differential pressure of fluid between said closed annular space and said annular passage to engage the annular friction member to the extent required to establish slipping frictional engagement between said input shell and said turbine, one of said two parts being driven via friction means and the two parts having cooperating stop elements that limit relative angular movement to substantially the effective control relationship so that regulation is quickly instituted.

2. A drive mechanism comprising:
a rotatable drive member;
a rotatable driven member;
means defining a hydrodynamic coupling between said members;
means defining a friction coupling between said members independent of the hydrodynamic coupling and effective to establish friction torque between said members in accordance with an applied force;
hydraulic elements operable to develop said applied force in accordance with applied hydraulic fluid pressure; and
means having two parts driven by said drive member and said driven member, respectively, defining a hydraulic fluid passage of size determined by the angular relation between said two parts, one of said parts being at least normally driven at a predetermined proportion of the speed of one of said members and the other of said parts being at least normally driven at the speed of the other of said members, said hydraulic fluid passage being disposed to vary the pressure of fluid in said hydraulic elements to engage the friction coupling to develop the torque required to establish a constant percentage slip between said members.

3. A drive mechanism comprising:
a rotatable drive member;
a rotatable driven member;
means defining a hydrodynamic coupling between said members;
means defining a friction clutch between said members independent of the hydrodynamic coupling and effective to establish a friction drive between said members in accordance with an engagement force;
means forming a clutch engagement chamber on one side of said friction clutch;
means forming a clutch disengagement chamber on the other side of said friction clutch, said engagement chamber and disengagement chamber being effective to develop a net engagement force on said friction clutch in accordance with hydraulic pressure differential between said chambers; and
means having two parts driven by said drive member and said driven member, respectively, defining a hydraulic fluid passage of size determined by the angular relation between said two parts and connecting said engagement chamber to said disengagement chamber, one of said parts being at least normally driven at a predetermined proportion of the speed of one of said members and the other of said parts being at least normally driven at the speed of the other of said members, said hydraulic fluid passage being disposed to vary the flow of fluid from said engagement chamber to said disengagement chamber to establish a differential pressure between said chambers to engage the friction clutch to the extent required to establish slipping frictional engagement between said members.

4. A drive mechanism comprising:
a rotatable drive member;
a rotatable driven member;
means defining a hydrodynamic device between said members;
means defining a friction coupling between said members independent of the hydrodynamic device and effective to establish friction torque between said members in accordance with an applied force;
hydraulic elements operable to develop said applied force in accordance with applied hydraulic fluid pressure;
a pair of coaxial telescoped members driven by said drive member and driven member, respectively, one of said members being so driven through friction elements; and
gear means connecting one of said telescoped members to be driven at a speed proportional to the speed of the rotatable driven member or drive member, said pair of coaxial telescoped members cooperatively defining a fluid passage of size determined by their angular relation with respect to each other, said passage at one end extending through the inner of said telescoped members and being in communication with the fluid from the hydrodynamic device and said passage at the other end extending through the outer of said telescoped members and into communication through a restricted passage with a fluid sump, whereby the fluid passage has variable area to vary the fluid pressure in said hydraulic elements to engage the friction coupling to the extent required to maintain a predetermined constant percentage slip between the members.

5. An automobile transmission, comprising:
drive means having an axis and defining an input shell portion and an impeller portion which together form a generally toroidal space;
output means defining a turbine located in said toroidal space and an output shaft extending outboard the same along the axis of the drive means, the impeller and turbine being in cooperative relationship to define a torque converter;
an annular friction member connected to said output means and disposed between the turbine and the input shell to engage the face of the input shell and define a frictional drive independent of the torque converter and having torque capability determined by the axial force applied to said member, said member being axially shiftable in relation to the input shell, said member defining a first closed annular space in relation to the input shell on the input shell side of said member and an annular passage for discharge fluid from the torque converter on the other side of said member, whereby the axial force on the friction member is determined by the fluid pressure differential between the respective sides of said member;
a pair of coaxial telescoped members located within the confines of said drive means, one of said members being connected to the drive means through friction elements; and
gear means located within the confines of the drive means connecting the other of said telescoped members to be driven by the output means at a speed proportional to and greater than the speed of the output member, said pair of coaxial telescoped members cooperatively defining a fluid passage of size determined by their angular relation with respect to each other, said passage at one end extending through the inner of said telescoped members and into communication with said annular passage for discharge fluid from the torque converter and said passage at the other end extending through the outer of said telescoped members and into communication with both the space between the annular friction member and the input shell and a restricted passage extending to a fluid sump, whereby the fluid pressure forcing the friction member into engagement is varied to engage the same to the extent required to maintain a predetermined constant percentage slip between the same and the input member.

6. A torque converter and clutch assembly comprising a drive unit having an axis and including impeller portions and an input shell portion; a turbine disposed in fluid flow relation with said impeller and defining a generally annular space in relation to the input shell; clutch means disposed in said space and being drivingly connected to said turbine, the clutch means being axially movable to frictionally engage said input shell in controlled slip relation so that part of the drive torque from the shell passes through the clutch and part passes through the turbine; and means responsive to relative motion between the drive unit and the turbine effective to decrease the axial engaging force of the clutch means as turbine speed increases relative to said drive unit, said means including a pair of relatively rotatable members connected respectively to the drive unit and the turbine in friction drive relation to at least one of them and having cooperating openings effective to define a fluid flow path of size determined by their angular relation, said clutch means having axial engaging force determined by the fluid flow through said path, and means to rotate one of said rotatable members at a predetermined proportional relation to the drive unit or turbine to which it is connected, whereby there is maintained a predetermined substantially constant percentage slip between the drive unit and the turbine.

* * * * *